(12) United States Patent
Kido

(10) Patent No.: US 9,763,304 B2
(45) Date of Patent: Sep. 12, 2017

(54) VISIBLE LIGHT COMMUNICATION APPARATUS AND METHOD FOR MANUFACTURING VISIBLE LIGHT COMMUNICATION APPARATUS

(71) Applicant: Panasonic Intellectual Property Management Co., Ltd., Osaka (JP)

(72) Inventor: Shojirou Kido, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/259,638

(22) Filed: Sep. 8, 2016

(65) Prior Publication Data

US 2017/0079106 A1     Mar. 16, 2017

(30) Foreign Application Priority Data

Sep. 10, 2015   (JP) ................. 2015-178894

(51) Int. Cl.
*H05B 33/08*   (2006.01)
*H05B 37/02*   (2006.01)
*H04B 10/116*  (2013.01)

(52) U.S. Cl.
CPC ....... *H05B 33/0854* (2013.01); *H04B 10/116* (2013.01); *H05B 33/0815* (2013.01); *H05B 37/0227* (2013.01); *H05B 37/0272* (2013.01)

(58) Field of Classification Search
CPC H05B 33/08; H05B 33/0815; H05B 33/0851; H05B 33/0854; H05B 37/02; H05B 37/0227; H05B 37/0272; H04B 10/04; H04B 10/116; H04B 10/1149

USPC .... 315/149, 151, 185 R, 291, 307, 308, 312
See application file for complete search history.

(56) References Cited

U.S. PATENT DOCUMENTS

2007/0182347 A1\* 8/2007 Shteynberg ........ H05B 33/0815
 315/312
2008/0258641 A1\* 10/2008 Nakagawa ......... H05B 33/0851
 315/246
2011/0222849 A1\* 9/2011 Han ................... H04B 10/1149
 398/25

(Continued)

FOREIGN PATENT DOCUMENTS

JP        2012-69505 A     4/2012
JP        2014-099283      5/2014

(Continued)

*Primary Examiner* — Thai Pham
(74) *Attorney, Agent, or Firm* — McDermott Will & Emery LLP

(57) ABSTRACT

A visible light communication apparatus includes: a light source; a power source circuit which applies a voltage to an electric path for causing the light source to emit light; a modulation circuit which causes the light source to emit light modulated by a communication signal; and a function circuit section which is connected to the electric path and performs a predetermined function by operating on a current flowing through the electric path, the function circuit section operating on a voltage lower than a first voltage value which is a lowest voltage value at which the light source emits light and higher than or equal to a second voltage value, wherein the power source circuit further applies to the electric path the voltage lower than the first voltage value and higher than or equal to the second voltage value.

12 Claims, 9 Drawing Sheets

(56) References Cited

U.S. PATENT DOCUMENTS

2012/0051757 A1* 3/2012 Nishino ............ H04B 10/1149
398/201
2014/0159586 A1 6/2014 Kido

FOREIGN PATENT DOCUMENTS

| | | |
|---|---|---|
| JP | 2014-107251 | 6/2014 |
| JP | 2014-135716 | 7/2014 |
| JP | 2014-216196 A | 11/2014 |

* cited by examiner

VISIBLE LIGHT COMMUNICATION APPARATUS AND METHOD FOR MANUFACTURING VISIBLE LIGHT COMMUNICATION APPARATUS

CROSS REFERENCE TO RELATED APPLICATION

This application claims the benefit of priority of Japanese Patent Application Number 2015-178894 filed on Sep. 10, 2015, the entire content of which is hereby incorporated by reference.

BACKGROUND

1. Technical Field

The present disclosure relates to a visible light communication apparatus and a method for manufacturing a visible light communication apparatus.

2. Description of the Related Art

A conventional visible light communication apparatus proposed includes a light-emitting diode (LED) as a light source and transmits a communication signal by modulating the intensity of illumination light emitted by the light source. Since the visible light communication apparatus transmits the communication signal by modulating the intensity of illumination light, no appliance (such as an infrared-ray communication apparatus) dedicated to transmitting the communication signal is required. Application of the visible light, communication apparatus to a ubiquitous information system in an underground mall, for example, is under consideration because the use of the light-emitting diode as the illumination light source enables electric power conservation.

There is a conventional visible light communication apparatus which, by having a simple circuit for communication added to an illumination apparatus, can modulate output light with a high degree of fidelity according to a high-frequency optical communication signal (for example, see Patent Literature 1 (PTL 1): Japanese Unexamined Patent Application Publication No. 2012-69505).

With a circuit added to the illumination apparatus, addition of not only the function of transmitting a communication signal by modulating the intensity of illumination light, but also a communication function for transmitting and receiving communication signals through radio waves (for example, radio wave beacon transmission function) or a function of dimming or turning on and off the light source via a wireless module is desired.

SUMMARY

In the case of adding the above-described circuit to an existing illumination apparatus, it is convenient to connect the circuit in such a manner that the circuit operates by receiving electric power from a power source circuit which supplies electric power to an LED serving as the light source.

The above connection, however, has a problem that when the LED serving as the light source is turned off due to the dimming control, a circuit having the above function cannot receive the electric power and is thus unable to operate.

In view of these circumstances, it is an object of the present disclosure to provide a visible light communication apparatus and so forth which allow an additional circuit to appropriately operate even when the light source is turned off due to the dimming control.

In order to achieve the object described above, a visible light communication apparatus according to an aspect of the present disclosure includes a light source; a power source circuit which is connected to the light source via an electric path and applies to the electric path a voltage for causing the light source to emit light; a modulation circuit which is connected to the electric path and modulates, based on a communication signal, a current value of a current flowing through the light source from the power source circuit, to cause the light source to emit light modulated by the communication signal; and a function circuit section which is connected to the electric path and performs a predetermined function by operating on a current flowing through the electric path, the function circuit section operating on a voltage lower than a first voltage value and higher than or equal to a second voltage value, the first voltage value being a lowest voltage value at which the light source emits light, wherein the power source circuit further applies to the electric path the voltage lower than the first voltage value and higher than or equal to the second voltage value.

Furthermore, in order to achieve the object described above, a method for manufacturing a visible light communication apparatus according to an aspect of the present disclosure includes mounting a light source on a light source board; mounting on a power source board a power source circuit which is connected to the light source via an electric path and applies to the electric path a voltage for causing the light source to emit light; and mounting on an additional circuit board (i) a modulation circuit which is connected to the electric path and modulates, based on a communication signal, a current value of a current flowing through the light source from the power source circuit, to cause the light source to emit light modulated by the communication signal and (ii) a function circuit section which is connected to the electric path and performs a predetermined function by operating on a current flowing through the electric path, the function circuit section operating on a voltage lower than a first voltage value and higher than or equal to a second voltage value, the first voltage value being a lowest voltage value at which the light source emits light, wherein the power source circuit further applies to the electric path the voltage lower than the first voltage value and higher than or equal to the second voltage value.

The visible light communication apparatus according to the present disclosure allows an additional circuit to appropriately operate even when the light source is turned off clue to the dimming control.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Figure 1:
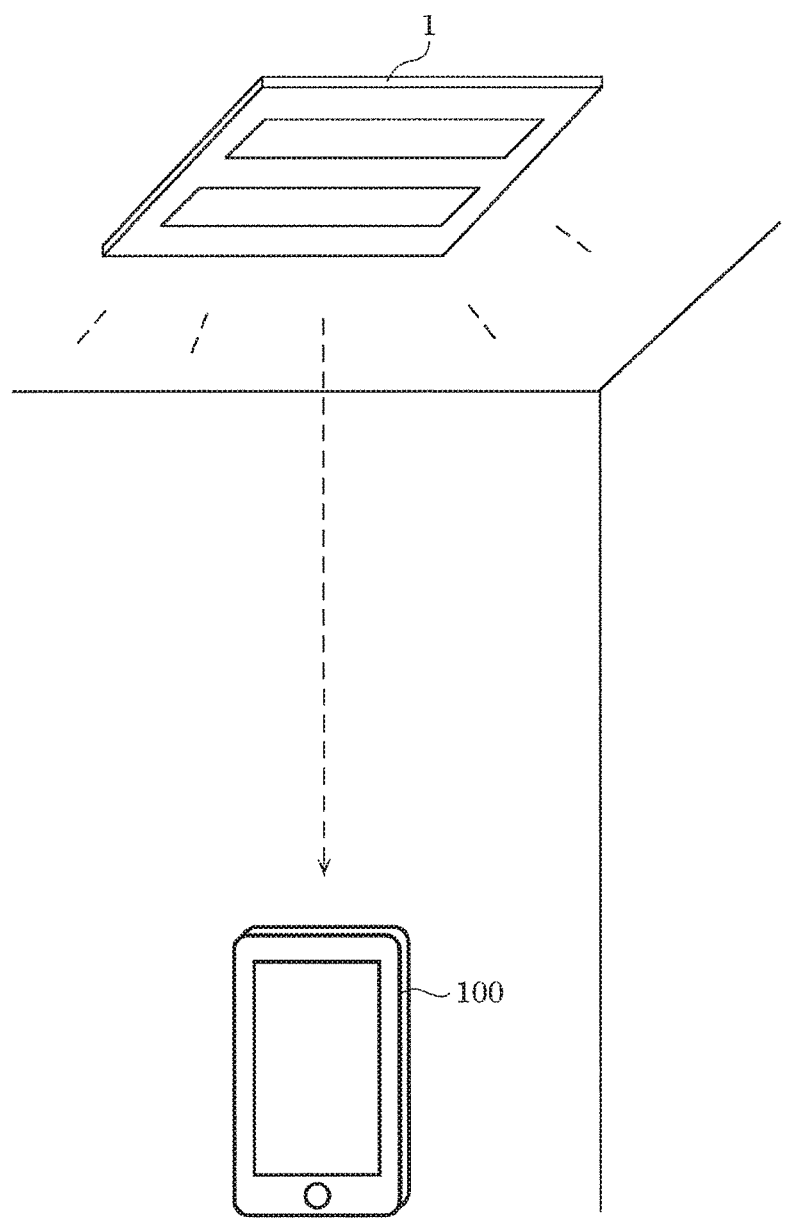
FIG. 1 is an overview diagram of a visible light communication system according to an embodiment.

Hereinafter, a visible light communication apparatus according to an embodiment of the present disclosure will be described in detail with reference to the drawings. It is to be noted that the embodiment described below is to show a specific example of the present disclosure. Therefore, the numerical values, shapes, materials, structural elements, the arrangement and connection of the structural elements, steps, and the processing order of the steps etc., shown in the following embodiment are mere examples, and are therefore not intended to limit the present disclosure. Thus, among the structural elements in the following embodiment, structural elements not recited in any one of the independent claims representing the most generic concept of the present disclosure are described as arbitrary structural elements.

It is also to be noted that each drawing is a schematic diagram and is not necessarily a precise illustration. Furthermore, in the drawings, like reference signs are given to like structural components.

Embodiment

The present embodiment describes a visible light communication apparatus which allows an additional circuit to appropriately operate even when the light source is turned off due to dimming control.

FIG. 1 is an overview diagram of a visible light communication system according to the present embodiment.

As illustrated in FIG. 1, the visible light communication system according to the present embodiment includes visible light communication apparatus 1 and terminal 100.

Visible light communication apparatus 1 is an illumination apparatus which illuminates an area surrounding visible light communication apparatus 1 by emitting illumination light to the surroundings. The illumination light emitted by visible light communication apparatus 1 includes a communication signal (a visible light communication signal). In other words, visible light communication apparatus 1 transmits the communication signal to terminal 100 through visible light communication.

Terminal 100 is an information terminal which receives the illumination light. Terminal 100 receives the illumination light emitted by visible light communication apparatus 1 and obtains the communication signal included in the illumination light received. Terminal 100 includes a photodiode or a camera (imaging device), for example, and receives the illumination light using the photodiode or camera.

For example, in the visible light communication system, visible light communication apparatus 1 can be used as an optical beacon transmitter which regularly transmits to the surroundings an optical beacon including an identifier (ID) (also referred to as an "optical ID") unique to visible light communication apparatus 1. The optical ID is an identifier by which visible light communication apparatus 1 can be distinguished from other apparatuses. The regular transmission, by visible light communication apparatus 1, of light including the optical ID as the communication signal allows terminal 100 receiving the light to obtain the optical ID from the light received and find out the current position and the like based on the optical ID obtained.

Figure 2:
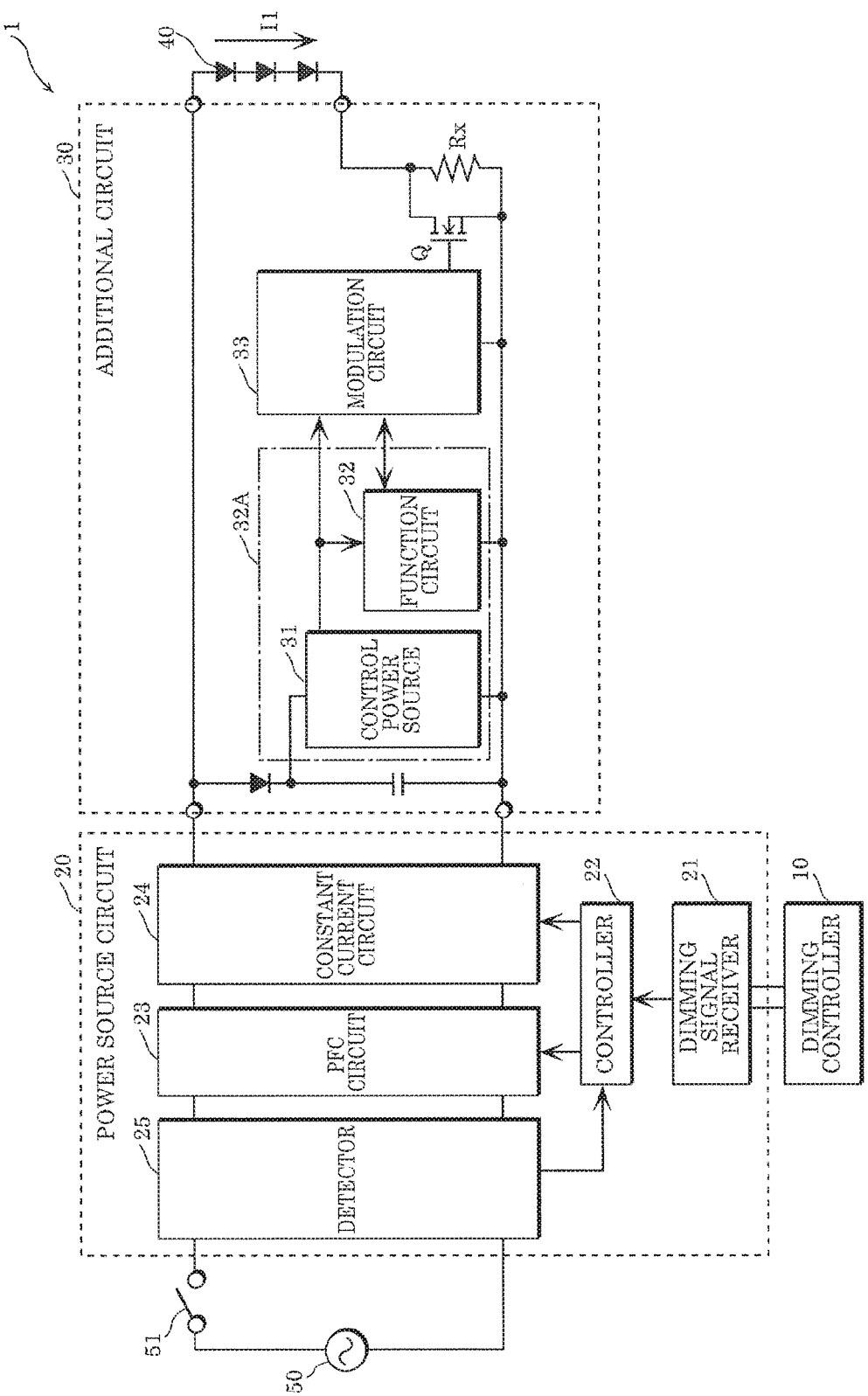
FIG. 2 is a block diagram illustrating a configuration of a visible light communication apparatus according to an embodiment.

FIG. 2 is a block diagram illustrating a configuration of visible light communication apparatus 1 according to the present embodiment.

As illustrated in FIG. 2, visible light communication apparatus 1 includes dimming controller 10, power source circuit 20, additional circuit 30, and light source 40.

Dimming controller 10 is a control circuit which controls a dimming level of visible light communication apparatus 1 serving as an illumination apparatus. Specifically, dimming controller 10 receives a user operation related to the dimming level and transmits to dimming signal receiver 21 included in power source circuit 20 a dimming signal corresponding to a dimming level determined according to the user operation received. For example, dimming controller 10 receives the user operation via a "dimming knob" indicating a dimming level in a range from 0% to 100%, and transmits, as the dimming signal, a pulse width modulation (MAIM) signal corresponding to the dimming level received via the dimming knob.

Power source circuit 20 is a power source circuit which is connected to light source 40 and each circuit included in visible light communication apparatus 1 via an electric path on the output side, and supplies DC electric power to light source 40 and each circuit via the electric path on the output side. An electric path on the input side of power source circuit 20 is connected to external power source 50 via switch 51. Power source circuit 20 supplies electric power to light source 40 and each circuit included in visible light communication apparatus 1 by applying a voltage to the electric path on the output side based on electric power supplied via the electric path on the input side. It is to be noted that the electric path on the output side may be simply referred to as an "electric path", and the electric path on the input side may also be referred to as a "power line."

Power source circuit 20 outputs a voltage and a current in one of the following three operation modes which are different in output voltage and output current: full illumination mode, dimming mode, and function mode. The full illumination mode, dimming mode, and function mode are selected when the dimming level is set to 100%, 50%, and 0%, using the dimming knob, respectively. The output voltage and the output current in each operation mode will be described in detail later. It is to be noted that switch 51 is provided outside visible light communication apparatus 1 and is, for example, a wall switch embedded in a building component. Switch 51 receives an ON operation (hereinafter also simply referred to as "ON") and an OFF operation (hereinafter also simply referred to as "OFF") performed by a user, and changes whether or not electric power supply from external, power source 50 to power source circuit 20 is to be performed, it is to be noted that the full illumination mode and the dimming mode are also referred to as a first operation mode and the function mode is also referred to as a second operation mode.

Power source circuit 20 operates in either one of a constant current mode and a constant voltage mode. The constant current mode is a mode in which the value of a current passed through the electric path on the output side is maintained at a predetermined value. The constant voltage mode is a mode in which the value of a voltage applied to the electric path on the output side is maintained at a predetermined value.

Power source circuit 20 includes dimming signal receiver 21, controller 22, power factor correction (PFC) circuit 23, constant current circuit 24, and detector 25.

Figure 7:
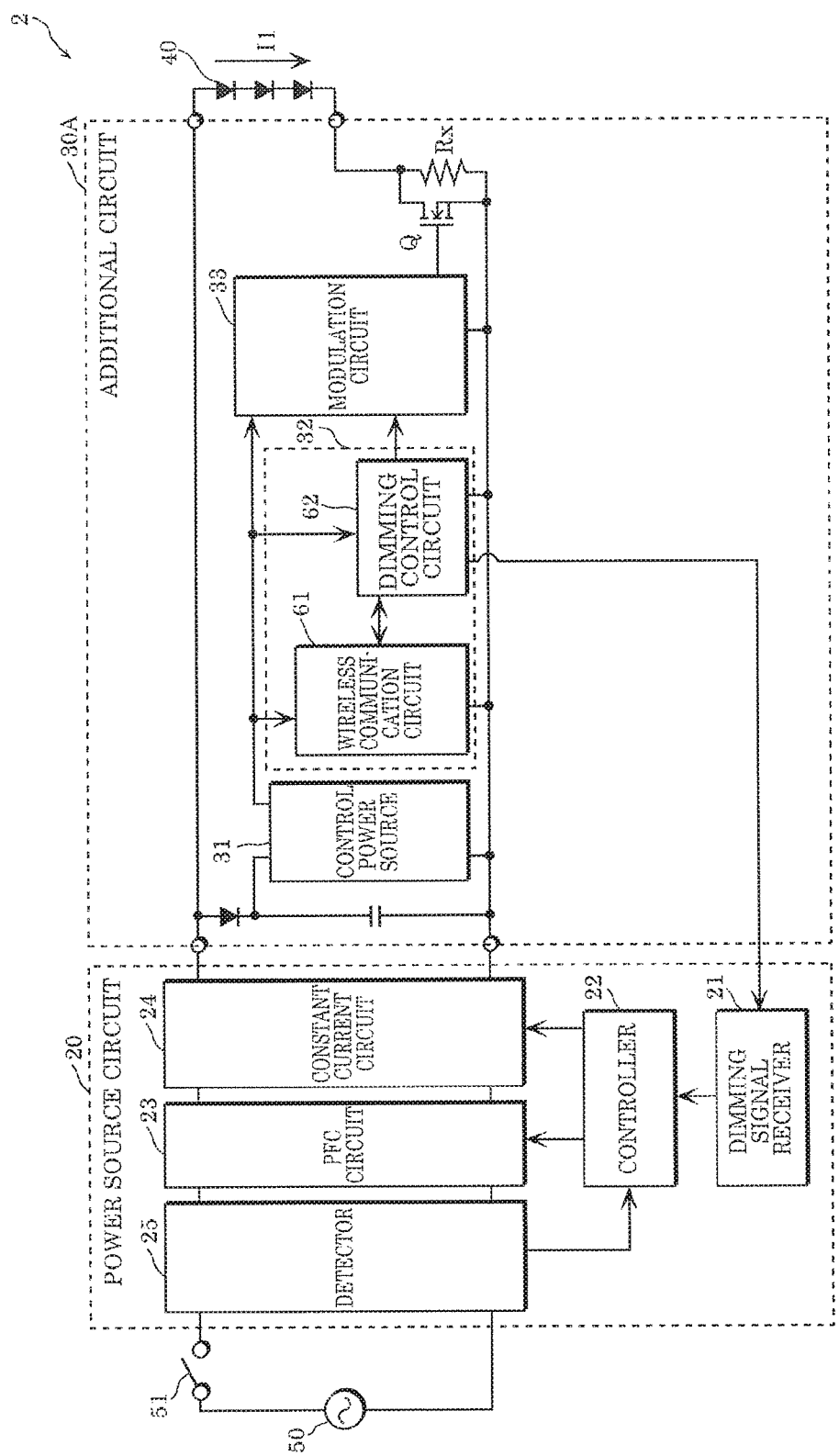
FIG. 7 is a block diagram illustrating a first example of a detailed configuration of a visible light communication apparatus according to an embodiment.

Dimming signal receiver 21 receives a dimming signal from dimming controller 10. Specifically, dimming signal receiver 21 receives, as the dimming signal, the PWM signal transmitted by dimming controller 10. In sonic, cases, dimming signal receiver 21 receives the dimming signal from dimming control circuit 62 (FIG. 7).

Controller 22 changes the operation mode of power source circuit 20 based on the dimming signal received by dimming signal receiver 21 and the user operation detected by detector 25, and controls FTC circuit 23 and constant current circuit 24 based on the operation mode. Furthermore, when the dimming signal received by dimming signal receiver 21 from dimming control circuit 62 is a signal for changing the operation mode, controller 22 changes the operation mode based on the dimming signal.

PFC, circuit 23 is a circuit for correcting the power factor of the electric power supplied, from external power source 50.

Constant current circuit 24 is a current output maintains the current output from power source circuit 20 at a constant value.

Detector 25 is a sensor which detects that an OFF-ON operation or a predetermined ON and OFF operation has been performed by the user on switch 51. Here, the OFF-ON operation is an operation of turning switch 51 off when switch 51 is in the ON state (OFF operation) and then turning switch 51 on (ON operation) within a predetermined time period (two seconds, for example). The predetermined ON and OFF operation is an operation of performing the ON operation and the OFF operation on switch 51 a plurality of times consecutively at predetermined timings. The predetermined ON and OFF operation will be described later with a specific example.

Detector 25 detects whether or not electric power is being supplied from external power source 50 by monitoring the voltage supplied from external power source 50. Detector 25 detects that the OFF operation has been performed on switch 51, by detecting a change from a state in which the electric power is supplied to a state in which the electric power is riot supplied. Similarly, detector 25 detects that the ON operation has been performed on switch 51, by detecting a change from the state in which the electric power is not supplied to the state in which the electric power is supplied. When detector 25 detects that the ON operation has been performed within the predetermined time period since the OFF operation, detector 25 detects that the OFF-ON operation has been performed. Similarly, detector 25 detects that the predetermined ON and OFF operation has been performed when the timing of the ON operation and the OFF operation matches a pattern determined in advance as the predetermined ON and OFF operation.

Additional circuit 30 is a circuit which is connected to the electric path connecting power source circuit 20 and light source 40 and operates on a current flowing from power source circuit 20 to light source 40. Additional circuit 30 includes control power source 31, function circuit 32, and modulation circuit 33. It is to be noted that the section including control power source 31 and function circuit 32 is also referred to as function circuit section 32A.

Control power source 31 is a power source circuit which generates a voltage on which each circuit included in additional circuit 30 operates, by increasing or decreasing the voltage applied to power source circuit 20. Control power source 31 operates on a voltage lower than a lowest voltage value at which light source 40 emits light (first voltage value) and higher than or equal to a second voltage value lower than the first voltage value. The voltage supplied by control power source 31 to each circuit included in additional circuit 30 is 5 V, for example.

Function circuit 32 is a circuit which operates on the voltage generated by control power source 31 to perform a predetermined function. There is a wide variety of functions which may be performed by function circuit 32, for example, the function to receive dimming control through wireless communication, the function to detect a person in a surrounding area using a human sensor, and the function to transmit; a radio beacon. Circuits included in function circuit 32 and the function of function circuit 32 will be described in detail later.

Modulation circuit 33 is a circuit which modulates current value I of a current flowing through light source 40, based on a communication signal transmitted by visible light communication apparatus 1. Specifically, modulation circuit 33 modulates current value I of the current flowing through light source 40 from power source circuit 20, by generating an electric signal having an amplitude corresponding to a communication signal to be transmitted outside by visible light communication apparatus 1 and then driving field-effect transistor Q (FETQ) based on the electric signal generated.

Light source 40 is a light source for visible light communication apparatus 1 and performs light emission to emit illumination light outside visible light communication apparatus 1. Light source 40 emits light at an intensity corresponding to the electric power supplied by power source circuit 20, more specifically, an intensity corresponding to the current value of the current flowing through light source 40 from power source circuit 20. When the current value is modulated by modulation circuit 33 based on the communication signal, light source 40 emits light modulated by the communication signal. In other words, light source 40 emits light including the communication signal. Light source 40 is, for example, a light-emitting diode or an organic electroluminescent (EL) element and has the property of emitting light when a voltage higher than or equal to a forward voltage (Vf) is applied and practically not emitting light and being turned off when a voltage lower than the forward voltage is applied.

It is to be noted that a conventional illumination apparatus having the dimming function corresponds to visible light communication apparatus in FIG. 2 with no additional circuit 30. In other words, visible light, communication apparatus 1 is equivalent to the conventional illumination apparatus having the dimming function with addition of additional circuit 30. Visible light communication apparatus 1 can be considered as the conventional illumination apparatus having the dimming function with a modification to the operation of power source circuit 20 in such a manner that additional circuit 30 can appropriately operate. It is to be noted that the conventional illumination apparatus having the dimming function is hereinafter referred also to as an "illumination apparatus according to a related art."

Figure 3:
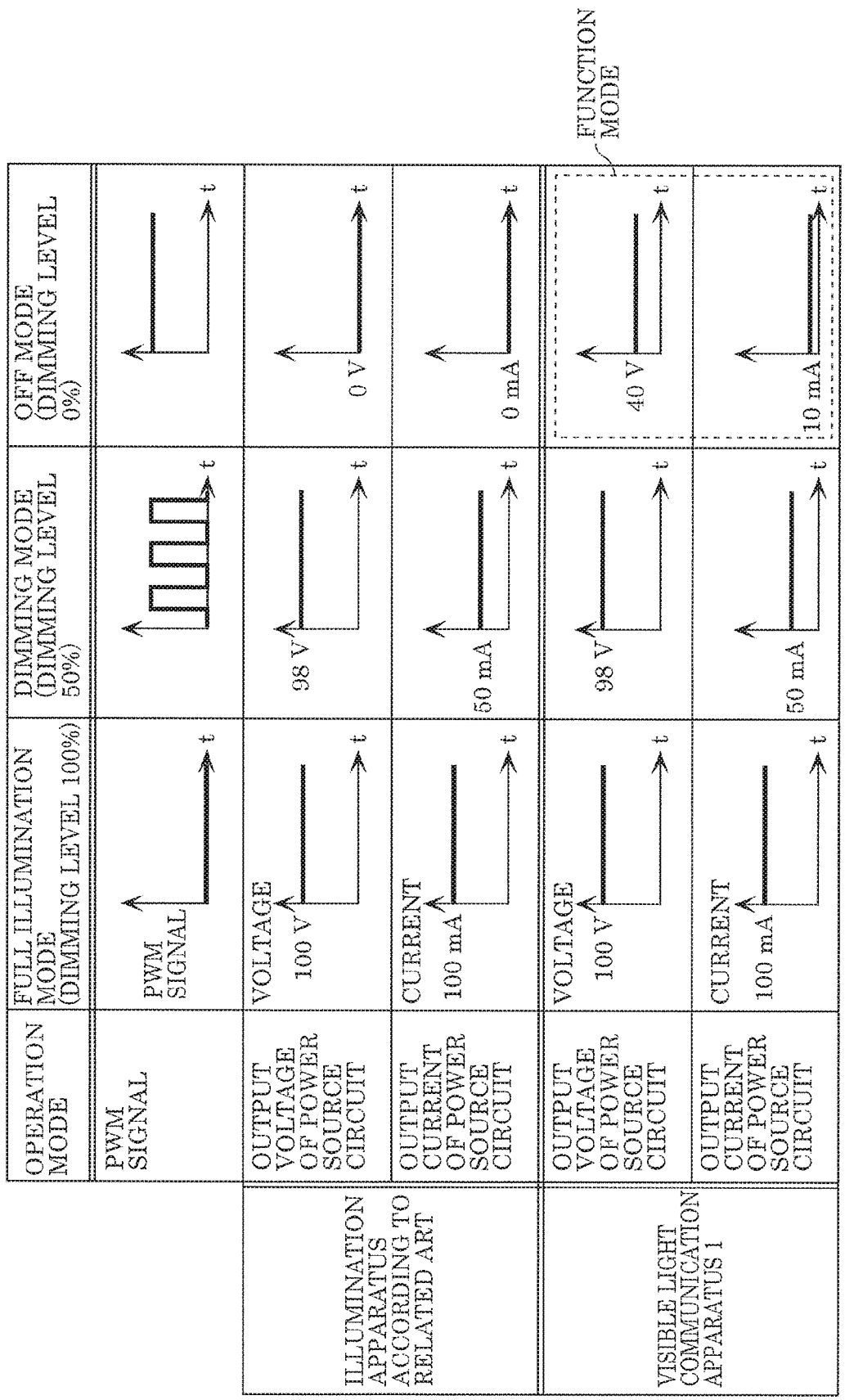
FIG. 3 is a diagram illustrating voltages and currents which a visible light communication apparatus according to an embodiment outputs in each operation mode.

FIG. 3 is a diagram illustrating voltages and currents which visible light communication apparatus 1 according to the present embodiment outputs in each operation mode. FIG. 3 illustrates, for each of the illumination apparatus according to the related art and visible light communication apparatus 1 according to the present embodiment, an example of output voltage and output current of the power source circuit in each operation mode. It is to be noted that among the operation modes of visible light communication apparatus 1, the illumination apparatus according to the related art does not have the function mode. When the dimming level of the illumination apparatus according to the related art is set to 0% using the dimming knob, the operation mode is an OFF mode in which light source 40 is turned off. Thus, the cells for the illumination apparatus according to the related art which correspond to the function mode show an output voltage and an output current in the OFF mode.

Operation modes include three modes: full illumination mode, dimming mode, and OFF mode, in each of which power source circuit 20 outputs a different voltage and a different current.

As illustrated in FIG. 3, in the full illumination mode, both power source circuit 20 of the illumination apparatus according to the related art and power source circuit 20 of visible light communication apparatus 1 according to the present embodiment output a voltage of 100 V (or 110 V) and a current of 100 mA and operate in the constant current mode. This allows light source 40 to emit light at a dimming level of 100%.

In the dimming mode, both power source circuits 20 output a voltage, of 98 V and a current of 50 mA and operate in the constant current mode. This allows light source 40 to emit light at a dimming level of 50%. It is to be noted that the dimming mode may refer to the state in which the dimming level is higher than 0% and lower than 100%.

When the illumination apparatus according to the related art is in the OFF mode, power source circuit 20 outputs a voltage of 0 V and a current of 0 mA. This allows light source 40 to be turned off with no light emission.

In contrast, when visible light communication apparatus 1 is in the function mode, power source circuit 20 outputs a voltage lower than a lowest voltage value at which light source 40 emits light (first voltage value) and higher than or equal to a lowest voltage value at which function circuit section 32A operates (second voltage value). Power source circuit 20 operates in the constant voltage mode. For example, power source circuit 20 outputs a voltage of 40 V and a current of 10 mA.

That is to say, in the function mode, power source circuit 20 applies a voltage which does not allow light source 40 to emit light but allows additional circuit 30 to operate. With this, visible light communication apparatus 1 allows additional circuit 30 to operate even when light source 40 is turned off due to the dimming control. It is to he noted that power source circuit 20 may apply to the electric path a voltage lower than the average of the first voltage value and the second voltage value. This allows function circuit section 32A to operate at a lower voltage and leads to reduction of power consumption.

Next, operation mode transitions of visible light communication apparatus 1 will be described.

Figure 4:
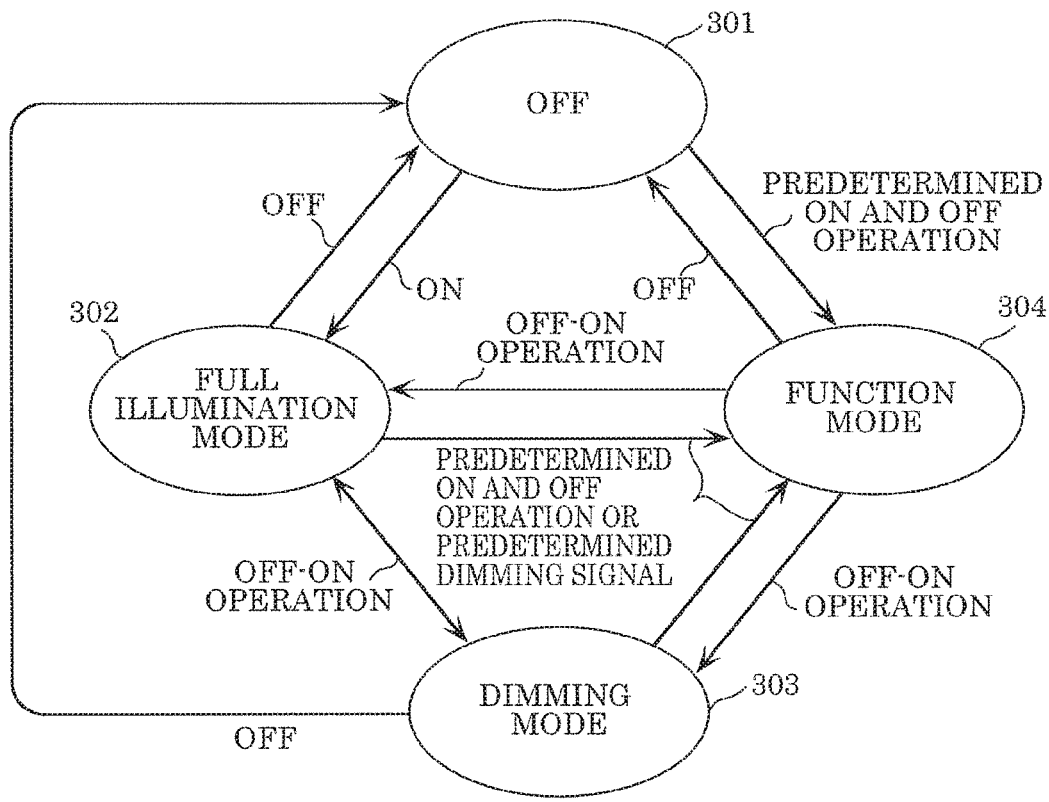
FIG. 4 is a diagram illustrating operation mode transitions of a visible light communication apparatus according to an embodiment.

FIG. 4 is a diagram illustrating operation mode transitions of visible light communication apparatus 1 according to the present embodiment.

FIG. 4 illustrates full illumination mode 302, dimming mode 303, and function mode 304 as the operation modes of power source circuit 20. FIG. 4 also illustrates, as OFF 301, the state in which the electric power supply from external power source 50 to power source circuit 20 is cut off by switch 51 OFF state). Hereinafter, mode transitions of power source circuit 20 brought about by controller 22 will be described.

Power source circuit 20 in the state of OFF 301 transitions to full illumination mode 302 when the ON operation is performed on switch 51. Power source circuit 20 in full illumination mode 302 transitions to the state of OFF 301 when the OFF operation is performed on switch 51.

Power source circuit 20 in full illumination mode 302 transitions to dimming; mode 303 when the OFF-ON operation is performed on switch 51. Power source circuit 20 in dimming mode 303 transitions to full illumination mode 302 when the OFF-ON operation is performed on switch 51.

Power source circuit 20 in the state of OFF 301 transitions to function mode 304 when the predetermined ON and OFF operation is performed on switch 51. Power source circuit 20 in function mode 304 transitions to the state of OFF 301 when the OFF operation is performed on switch 51.

Power source circuit 20 in function mode 304 transitions to dimming mode 303 when the OFF-ON operation is performed on switch 51. Power source circuit 20 in dimming mode 303 transitions to function mode 304 when the predetermined ON and OFF operation is performed on switch 51. Power source circuit 20 in dimming mode 303 may transition to function mode 304 also when dimming signal receiver 21 receives a predetermined dimming signal.

Power source circuit 20 in function mode 304 transitions to full illumination mode 302 when the OFF-ON operation is performed on switch 51. Power source circuit 20 in full illumination mode 302 transitions to function mode 304 when the predetermined ON and OFF operation is performed on switch 51. Power source circuit 20 in full illumination mode 302 may transition to function mode 304 also when dimming signal receiver 21 receives a predetermined, dimming signal.

It is to be noted that whether to transition to full illumination mode 302 or dimming mode 303 when the OFF-ON operation is performed in function mode 304 may be determined in any manner. For example, power source circuit 20 may transition to the operation mode in which power source circuit 20 had been operating immediately before power source circuit 20 transitioned to function mode 304. Or, power source circuit 20 may transition to a predetermined one of full illumination mode 302 and dimming mode 303.

Figure 5:
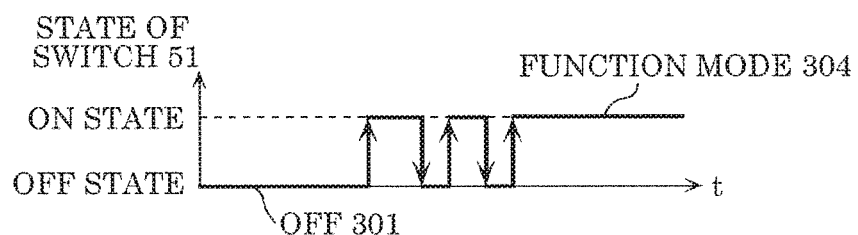
FIG. 5 is a diagram illustrating a predetermined ON and OFF operation for changing an operation mode of a visible light communication apparatus according to an embodiment to a function mode.

FIG. 5 is a diagram illustrating the predetermined ON and OFF operation for changing the operation mode of visible light communication apparatus 1 according to the present embodiment to the function mode. FIG. 5 illustrates an example of a pattern determined in advance as the predetermined ON and OFF operation.

The predetermined ON and OFF operation is, for example, an operation of performing the ON operation and the OFF operation on switch 51 a plurality of times consecutively without an interval greater than or equal to a predetermined time period (two seconds, for example). More specifically, it is an operation of performing the ON operation and the OFF operation sequentially on switch 51, such as ON, OFF, ON, OFF, and then ON (FIG. 5), for example. The ON and OFF pattern described above is a mere example and may be a different pattern combining a smaller or larger number of ONs and OFFs. It is to be noted that this ON and OFF pattern may be different from a pattern similar to the OFF-ON operation performed for the transition between full illumination mode 302 and dimming mode 303. This is to prevent detector 25 from falsely recognizing the predetermined ON and OFF operation as the above OFF-ON operation.

Figure 6:
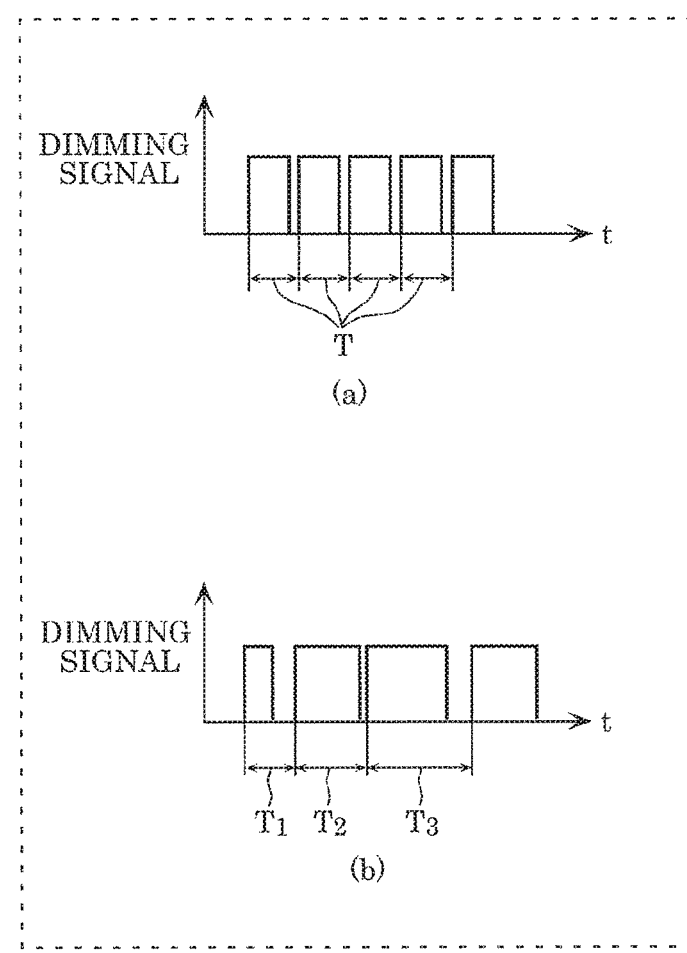
FIG. 6 is a diagram illustrating a dimming signal for changing an operation mode of a visible light communication apparatus according to an embodiment to a function mode.

FIG. 6 is a diagram illustrating a dimming signal for changing the operation mode of visible light communication apparatus 1 according to the present embodiment to the function mode.

The dimming signal illustrated in (a) of FIG. 6 is a PWM signal conventionally used for dimming light source 40. The PWM signal is a signal including a pulse for each constant cycle T and controls the dimming level of light source 40 according to the time duration of the pulse.

The dimming signal illustrated in (b) of FIG. 6 is a dimming signal used for the transition of visible light communication apparatus 1 from full illumination mode 302 or dimming mode 303 to function mode 304, and has a different pulse cycle (T1, T2, and T3, for example) for each pulse.

Dimming signal receiver 21 determines whether or not the cycle of the dimming signal received satisfies a predetermined condition. Specifically, dimming signal receiver 21 determines whether the dimming signal received is the PWM signal conventionally used for dimming light source 40 or the dimming signal used for the transition from full illumination mode 302 or dimming mode 303 to function mode 304 (hereinafter also referred to as a "transition dimming signal"). When the dimming signal received is the transition dimming signal, controller 22 controls PFC circuit 23 and constant current circuit 24 so as to cause power source circuit 20 to transition to function mode 304.

FIG. 7 is a block diagram illustrating visible light communication apparatus 2 as a first example of a detailed configuration of visible light communication apparatus 1 according to the present embodiment. Visible light communication apparatus 2 illustrated in FIG. 7 includes additional circuit 30A in which function circuit 32 includes wireless communication circuit 61 and dimming control circuit 62.

Wireless communication circuit 61 is a communication circuit which performs wireless communication with an external wireless communication apparatus (not illustrated) and receives through the wireless communication a signal for dimming control over visible light communication apparatus 2 (hereinafter also referred to as a "dimming control signal"). Wireless communication circuit 61 may further receive a predetermined signal for operation mode transition of power source circuit 20 from full illumination mode 302 or dimming mode 303 to function mode 304.

Dimming control circuit 62 generates a PWM signal determined according to the dimming control signal received by wireless communication circuit 61 and transmits the generated PWM signal to dimming signal receiver 21 as the dimming signal. When wireless communication circuit 61 has received the predetermined signal for causing power source circuit 20 to transition to function mode 304, dimming control circuit 62 generates the predetermined dimming signal (FIG. 4, (b) of FIG. 6) and transmits the generated predetermined dimming signal to dimming signal receiver 21.

With the above configuration, visible light communication apparatus 2 can receive the dimming control signal from the external wireless communication apparatus through wireless communication, perform dimming control over light source 40 based on the dimming control signal received, and cause power source circuit 20 to operate in function mode 304.

Figure 8:
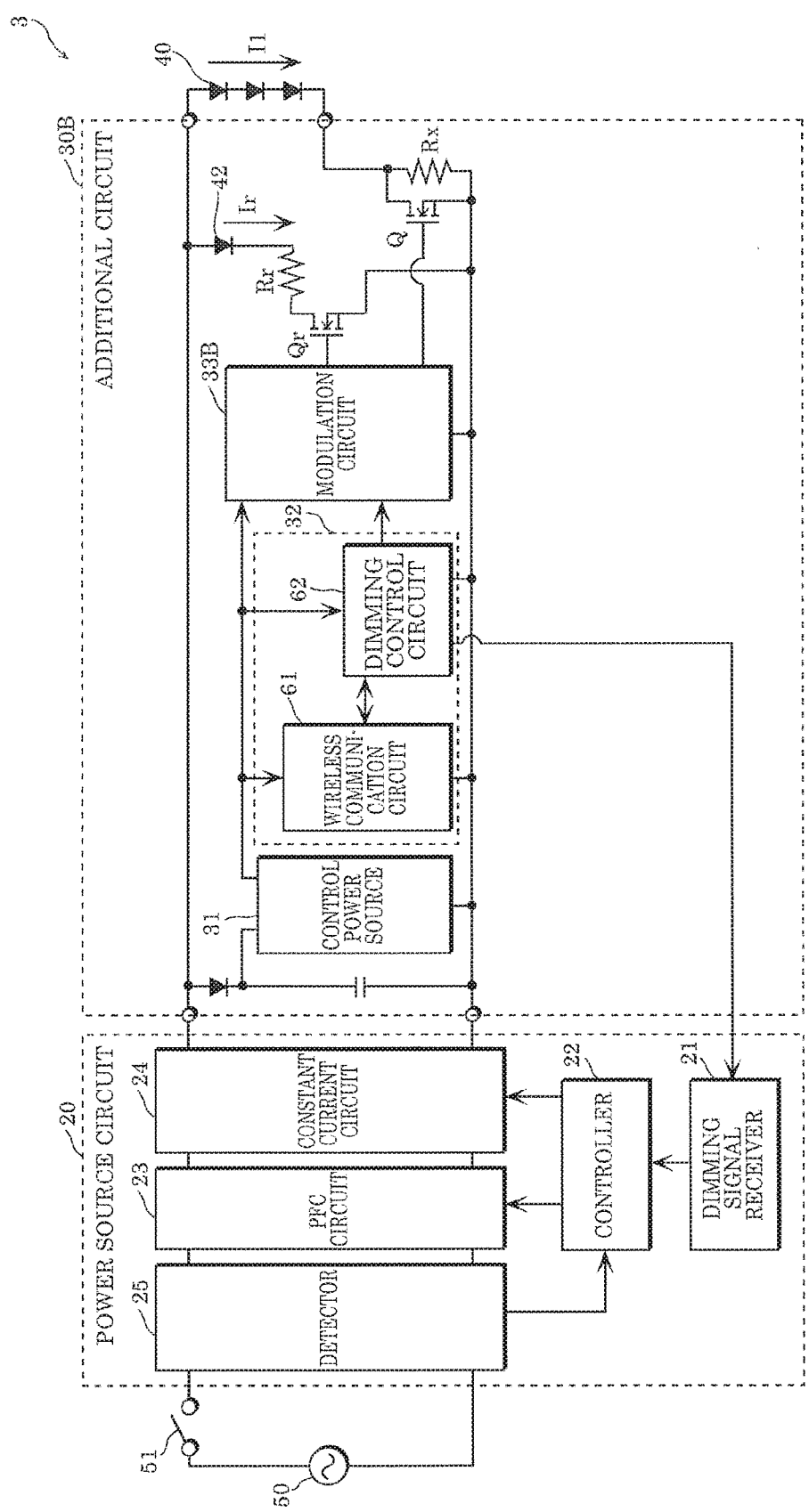
FIG. 8 is a block diagram illustrating a second example of a detailed configuration of a visible light communication apparatus according to an embodiment.

FIG. 8 is a block diagram illustrating visible light communication apparatus 3 as a second example of a detailed configuration of visible light communication apparatus 1 according to the present embodiment.

Visible light communication apparatus 3 illustrated in FIG. 8 includes additional circuit 30B which includes function circuit 32, modulation circuit 33B, and infrared light source 42.

Function circuit 32 is the same as function circuit 32 included in visible light communication apparatus 2 described above.

Like modulation circuit 33 included in visible light communication apparatuses 1 and 2 described above, modulation circuit 33B modulates current value I of a current flowing through light source 40, according to a communication signal transmitted by visible light communication apparatus 3. Modulation circuit 33B further modulates current value Ir of a current flowing through infrared light source 42, according to the communication signal. Specifically, modulation circuit 33B modulates current value Ir of the current flowing through infrared light source 42, by generating an electric signal having an amplitude corresponding to the communication signal and driving field-effect transistor Qr (FETQr) based on the electric signal generated.

With the above configuration, visible light communication apparatus 3 can perform infrared communication using infrared light source 42 when light source 40 is turned off. The infrared communication yields a benefit that by transmitting infrared rays including an optical ID of visible light communication apparatus 3 as the communication signal, it is possible to transmit the optical ID to the surroundings through the infrared rays when light source 40 is turned off.

Figure 9:
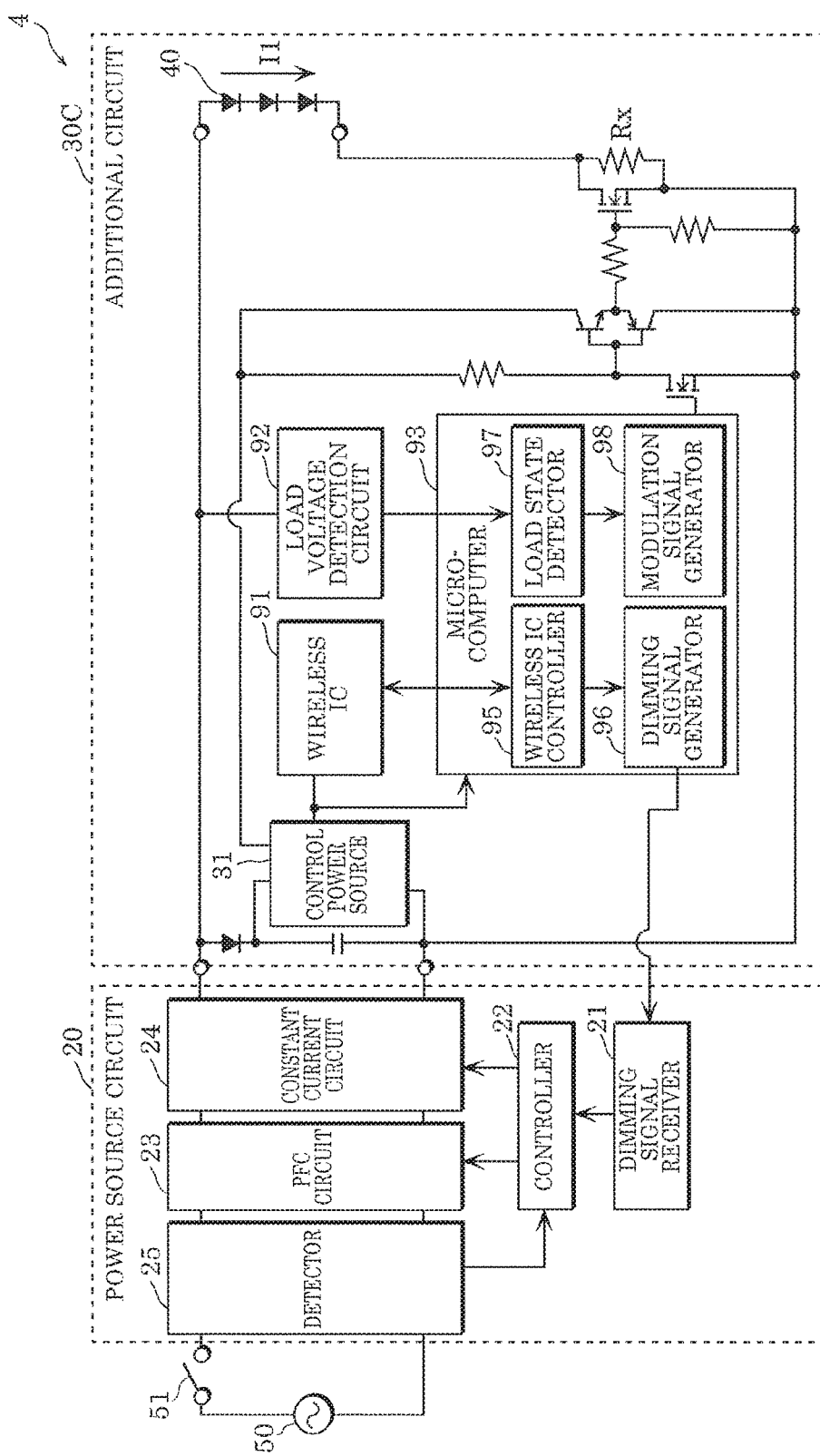
FIG. 9 is a block diagram illustrating a third example of a detailed configuration of a visible light communication apparatus according to an embodiment.

FIG. 9 is a block diagram illustrating visible light communication apparatus 4 as a third example of a detailed configuration of visible light communication apparatus 1 according to the present embodiment. Visible light communication apparatus 4 includes additional circuit 30C which includes wireless integrated circuit (IC) 91, load voltage detection circuit 92, and microcomputer 93.

Wireless IC 91 is a communication interface and a processing circuit which perform wireless communication with an external wireless communication apparatus (not illustrated). Load voltage detection circuit 92 is a detection circuit which detects a load voltage, that is, a voltage applied to light source 40.

Microcomputer 93 is a wireless communication function for dimming control and a modulation function for visible light communication which are implemented on a single microcomputer. Microcomputer 93 includes wireless IC controller 95, dimming signal generator 96, load state detector 97, and modulation signal generator 98.

Wireless IC controller 95 controls wireless IC 91. Specifically, wireless IC controller 95 obtains, from the communication signal received by wireless IC 91 from the above-mentioned wireless communication apparatus, the dimming control signal for dimming control over visible light communication apparatus 4.

Dimming signal generator 96 generates a PWM signal determined according to the dimming control signal obtained by wireless IC controller 95 and transmits the generated PWM signal to dimming signal receiver 21 as the dimming signal.

Load state detector 97 detects a load state, that is, the state of light source 40, based on the load voltage detected by load voltage detection circuit 92.

Modulation signal generator 98 modulates current value I of the current flowing through light source 40, based on the load state detected by load state detector 97.

With the above configuration, visible light communication apparatus 4 can implement the wireless communication function for dimming control and the modulation function for visible light communication, using a single microcomputer.

It is to be noted that function circuit 32 may include, other than those described above, a human sensor which senses a person in a surrounding area and a human-sensing control circuit which causes controller 22 to change the operation mode when the human sensor senses the person. With this, visible light communication apparatus 1 can control dimming or turning on and off of visible light communication apparatus 1 based on whether or not there is a person in the surrounding area.

Furthermore, function circuit 32 may include a radio beacon transmission circuit which transmits through radio waves a radio beacon including predetermined information to the surroundings. With this, visible light communication apparatus 1 can transmit the radio beacon to the surroundings using the radio beacon transmission circuit included in function circuit 32.

Next, a method for manufacturing visible light communication apparatus 1 will be described.

Figure 10:
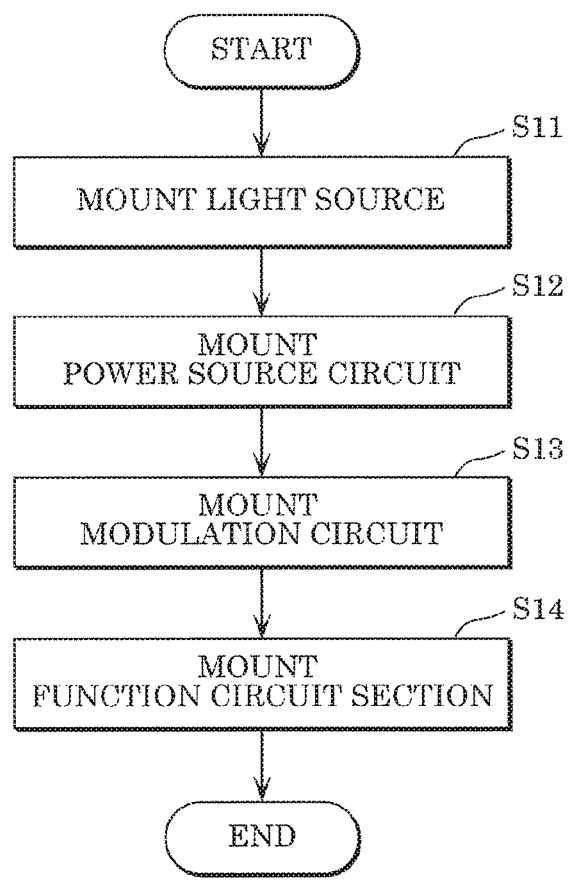
FIG. 10 is a flow diagram illustrating a method for manufacturing a visible light communication apparatus according to an embodiment.

FIG. 10 is a flow diagram illustrating a method for manufacturing visible light communication apparatus 1 according to the present embodiment.

In Step S11, light source 40 is mounted. Although this step is described using the case of mounting light source 40 on a board as an example, the object on which light source 40 is mounted is not limited to this. The same holds true for the subsequent steps. It is to be noted that in the case of mounting light source 40 on a board, the board on which light source 40 is mounted is also referred to as a "light source board."

In Step S12, power source circuit 20 is mounted. It is to be noted that the board on which power source circuit 20 is mounted is also referred to as a "power source board."

At this time point, manufacturing of an illumination apparatus with a dimming function, including light source 40 and power source circuit 20, is completed. It is to be noted that any of Steps SF1 and S12 may come first, or Steps S11 and S12 may be performed at the same time.

In Step S13, modulation circuit 33 is mounted. It is to be noted that the board on which modulation circuit 33 is mounted is also referred to as an "additional-circuit board."

In Step S14, function circuit section 32A (control power source 31 and function circuit 32) is mounted. It is to be noted that function circuit section 32A is mounted on the above-described additional-circuit board as an example.

At this time point, manufacturing of visible light communication apparatus 1 is completed. It is to be noted that any of Steps S13 and S14 may come first, or Steps S13 and S14 may be performed at the same time.

With the above series of flow, visible light communication apparatus 1 can be manufactured by mounting the modulation circuit and the function circuit section to the illumination apparatus having a dimming function but not having the visible light communication function.

As describe above, visible light communication apparatus 1 and so forth according to the present embodiment include: light source 40; power source circuit 20 which is connected to light source 40 via an electric path and applies to the electric path a voltage for causing light source 40 to emit light; modulation circuit 33 which is connected to the electric path and modulates, based on a communication signal, a current value of a current flowing through light source 40 from power source circuit 20, to cause light source 40 to emit light modulated by the communication signal; and function circuit section 32A which is connected to the electric path and performs a predetermined function, by operating on a current flowing through the electric path, function circuit section 32A operating on a voltage lower than a first voltage value and higher than or equal to a second voltage value, the first voltage value being a lowest voltage value at which light source 40 emits light, wherein power source circuit 20 further applies to the electric path the voltage lower than the first voltage value and higher than or equal to the second voltage value.

With visible light communication apparatus 1 described above, power source circuit 20 applies a voltage at which function circuit section 32A operates and light source 40 does not emit light. At this voltage, function circuit section 32A can operate without having light source 40 emit light, thus allowing the predetermined function of function circuit section 32A to be performed. Accordingly, visible light communication apparatus 1 allows an additional circuit to appropriately operate even when light source 40 is turned off due to the dimming control.

Power source circuit 20 may operate in either of: a constant current mode when light source 40 is caused to emit light, the constant current mode being a mode in which a current value of the current flowing through the electric path is maintained at a predetermined value: and a constant voltage mode when the voltage lower than the first voltage value and higher than or equal to the second voltage value is applied to the electric path, the constant voltage mode being a mode in which a voltage value of the voltage applied to the electric path is maintained at a predetermined value.

With this, visible light communication apparatus 1 allows function circuit section 32A to operate in the constant voltage mode in which the voltage value is maintained at the predetermined value, instead of the constant current mode which is generally used for light source 40 to emit light. This allows function circuit section 32A to operate stably.

Power source circuit 20 may apply to the electric path a voltage lower than the average of the first voltage value and the second voltage value.

With this, visible light communication apparatus 1 allows function circuit section 32A to operate at a relatively low voltage in a voltage range which allows function circuit section 32A to operate without having light source 40 emit light. This allows function circuit section 32A to operate at lower electric power, leading to an advantageous effect of reduction in power consumption.

Power source circuit 20 may selectively apply a voltage to the electric path in an operation mode which is one of the following: a first opera on mode in which a voltage higher than or equal to the first voltage value is applied to the electric path; and a second operation mode in which the voltage lower than the first voltage value and higher than or equal to the second voltage value is applied to the electric path, and power source circuit 20 may include controller 22 which changes the operation mode between the first operation mode and the second operation mode.

This allows visible light communication apparatus 1 to change its operation mode to any one of the following operation modes: the operation mode in which light source 40 emits light; the operation mode in which function circuit section 32A operates without having light source 40 emit light; and other operation mode(s).

Controller 22 may receive a pulse width modulation (PWM) signal, and change the operation mode between the first operation mode and the second operation mode based on the PWM Controller 22 may receive a pulse width modulation (PWM) signal, determine whether or not a cycle of the PWM signal received has made a predetermined change, and change the operation mode between the first operation mode and the second operation mode when the cycle has made the predetermined change.

With this, visible light communication apparatus 1 changes its operation mode based on the cycle of the PWM signal received from an external apparatus. The user thus can change the operation mode of visible light communication apparatus 1 by transmitting from an external apparatus to visible light communication apparatus 1 the PWM signal having a cycle which makes the predetermined change.

Power source circuit 20 may include detector 25 which (i) senses a voltage on a power line via which visible light communication apparatus 1 receives electric power supply from an external apparatus and (ii) detects, based on the voltage sensed, a predetermined ON and, OFF operation performed using switch 51 on the power line, and controller 22 may change the operation mode between the first operation mode and the second operation mode when detector 25 detects the predetermined ON and OFF operation.

With this, visible light communication apparatus 1 changes its operation mode based on the detection that the predetermined ON and OFF operation has been performed on switch 51. The user thus can change the operation mode of visible light communication apparatus 1 by performing the predetermined ON and OFF operation on switch 51 which is connected with visible light communication apparatus 1.

Function circuit section 32A may include: wireless communication circuit 61 which receives, from an external apparatus through wireless communication, a control signal for controlling dimming and turning on and off of visible light communication apparatus 1; and dimming control circuit 62 which generates a dimming signal based on the control signal received by wireless communication circuit 61, and power source circuit 20 may further include dimming signal receiver 21 which receives the dimming signal generated by dimming control circuit 62 and causes controller 22 to change the operation mode between the first operation mode and the second operation mode according to the dimming signal received.

With wireless communication circuit 61 and dimming control circuit 62 included in function circuit section 32A, above-described visible light communication apparatus 1 receives from external terminal 100 the signal for dimming or turning on and off of visible light communication apparatus 1. By using terminal 100, the user can control dimming or turning on and off of visible light communication apparatus 1.

As an example of illumination apparatuses, a spotlight lighting fixture to be mounted in a lighting duct generally has a two-wire system with the input voltage of AC 100 V or DC 12 V. Therefore, when a plurality of illumination apparatuses are to be dimmed individually, a dimming knob is used to manually make adjustments. Like visible light communication apparatus 1, there is a benefit that the dimming function using the wireless function becomes available by simply integrating modulation circuit 33 and wireless communication circuit 61 and adding the function mode in which an additional function is performed even when the light source is turned off.

Function circuit section 32A may include: a human sensor which senses a person in a surrounding area; and a human-sensing control circuit which causes controller 22 to change the operation mode between the first operation mode and the second operation mode when the human sensor senses the person.

With this, visible light communication apparatus 1 can control dimming or turning on and off of visible light communication apparatus 1 based on whether or not there is a person in the surrounding area.

Function circuit section 32A may include a radio beacon transmission circuit which transmits a radio beacon including predetermined information to surroundings through radio waves.

With this, visible light communication apparatus 1 can transmit the radio beacon to the surroundings using the radio beacon transmission circuit included in function circuit part 32A. When light source 40 is turned off, visible light communication apparatus 1 cannot transmit an optical beacon to the surroundings and terminal 100 cannot obtain position information, or the like based on the optical beacon. In view of this, transmitting a radio beacon instead of an optical beacon when light source 40 is turned off allows transmission of identification information of visible light communication apparatus 1 to terminal 100 in the surrounding area. With this, when terminal 100 cannot receive the optical beacon, terminal 100 receives the radio beacon instead, so that position information can be obtained.

The method for manufacturing visible light communication apparatus 1 according to the present embodiment includes: mounting light source 40 on a light source board (S11); mounting, on a power source board, power source circuit 20 which is connected to light source 40 via an electric path and applies to the electric path a voltage for causing light source 40 to emit light (S12); and mounting, on an additional-circuit board, (i) modulation circuit 33 which is connected to the electric path and modulates, based on a communication signal, a current value of a current flowing through light source 40 from power source circuit 20, to cause light source 40 to emit light modulated by the communication signal and (ii) function circuit section 32A which is connected to the electric path and performs a predetermined function by operating on a current flowing through the electric path, function circuit section 32A operating on a voltage lower than a first voltage value and higher than or equal to a second voltage value, the first voltage value being a lowest voltage value at which light source 40 emits light (S13 and S14), wherein power source circuit 20 further applies to the electric path the voltage lower than the first voltage value and higher than or equal to the second voltage value.

With this, visible light communication apparatus 1 can be manufactured by mounting the modulation circuit and the function circuit section to an illumination apparatus having a dimming function but not having a visible light communication function.

The method for controlling visible light communication apparatus 1 according to the present embodiment, visible light communication apparatus 1 including: light source 40; power source circuit 20 which is connected to light source 40 via an electric path and applies to the electric path a voltage for causing light source 40 to emit light; modulation circuit 33 which is connected to the electric path and modulates, based on a communication signal, a current value of a current flowing through light source 40 from power source circuit 30, to cause light source 40 to emit light modulated by the communication signal; and function circuit section 32A which is connected to the electric path and performs a predetermined function by operating on a current flowing through the electric path, function circuit section 32A operating on a voltage lower than a first voltage value and higher than or equal to a second voltage value, the first voltage value being a lowest voltage value at which light source 40 emits light, and the method including: applying to the electric path the voltage for causing light source 40 to emit light; and further applying to the electric path the voltage lower than the first voltage value and higher than or equal to the second voltage value.

Others

Although a visible light communication apparatus and a method for manufacturing a visible light communication apparatus according to the present disclosure have been described, based on the above embodiment, the present disclosure is not limited to the above embodiment.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A visible light communication apparatus comprising:
a light source;
a power source circuit which is connected to the light source via an electric path and applies to the electric path a voltage for causing the light source to emit light;
a modulation circuit which is connected to the electric path and modulates, based on a communication signal, a current value of a current flowing through the light source from the power source circuit, to cause the light source to emit light modulated by the communication signal; and
function circuitry which is connected to the electric path and performs a predetermined function by operating on a current flowing through the electric path, the function circuitry operating on a voltage lower than a first voltage value and higher than or equal to a second voltage value, the first voltage value being a lowest voltage value at which the light source emits light,
wherein the power source circuit further applies to the electric path the voltage lower than the first voltage value and higher than or equal to the second voltage value.

2. The visible light communication apparatus according to claim 1,
wherein the power source circuit operates in either of:
a constant current mode when the light source is caused to emit light, the constant current mode being a mode in which a current value of the current flowing through the electric path is maintained at a predetermined value; and
a constant voltage mode when the voltage lower than the first voltage value and higher than or equal to the second voltage value is applied to the electric path, the constant voltage mode being a mode in which a voltage value of the voltage applied to the electric path is maintained at a predetermined value.

3. The visible light communication apparatus according to claim 1,
wherein the power source circuit applies to the electric path a voltage lower than an average of the first voltage value and the second voltage value.

4. The visible light communication apparatus according to claim 1,
wherein the power source circuit selectively applies a voltage to the electric path in an operation mode which is one of the following:
a first operation mode in which a voltage higher than or equal to the first voltage value is applied to the electric path; and
a second operation mode in which the voltage lower than the first voltage value and higher than or equal to the second voltage value is applied to the electric path, and
the power source circuit includes a controller which changes the operation mode between the first operation mode and the second operation mode.

5. The visible light communication apparatus according to claim 4,
wherein the controller receives a pulse width modulation (PWM) signal, and changes the operation mode between the first operation mode and the second operation mode based on the PWM signal.

6. The visible light communication apparatus according to claim 5,
wherein the controller determines whether or not a cycle of the PWM signal received has made a predetermined change, and changes the operation mode between the first operation mode and the second operation mode when the cycle has made the predetermined change.

7. The visible light communication apparatus according to claim 4,
wherein the power source circuit includes a detector which (i) senses a voltage on a power line via which the visible light communication apparatus receives electric power supply from an external apparatus and GO detects, based on the voltage sensed, a predetermined ON and OFF operation performed using a switch on the power line, and
the controller changes the operation mode between the first operation mode and the second operation mode when the detector detects the predetermined ON and OFF operation.

8. The visible light communication apparatus according to claim 4,
wherein the function circuitry includes:
a wireless communication circuit which receives, from an external apparatus through wireless communication, a control signal for controlling dimming and turning on and off of the visible light communication apparatus; and
a dimming control circuit which generates a dimming signal based on the control signal received by the wireless communication circuit, and
the power source circuit further includes a dimming signal receiver which receives the dimming signal generated by the dimming control circuit and causes the controller to change the operation mode between the first operation mode and the second operation mode according to the dimming signal received.

9. The visible light communication apparatus according aim 4,
wherein the function circuitry includes:
a human sensor which senses a person in a surrounding area; and a human-sensing control circuit which causes the controller to change the operation mode between the first operation mode and the second operation mode when the human sensor senses the person.

10. The visible light communication apparatus according to claim 1,
wherein the function circuitry includes a radio beacon transmission circuit which transmits a radio beacon including predetermined information to surroundings through radio waves.

11. A method for manufacturing a visible light communication apparatus, the method comprising:
mounting a light source on a light source board;
mounting on a power source board a power source circuit which is connected to the light source via an electric path and applies to the electric path a voltage for causing the light source to emit light; and
mounting on an additional-circuit board (i) a modulation circuit which is connected to the electric path and modulates, based on a communication signal, a current value of a current flowing through the light source from the power source circuit, to cause the light source to emit light modulated by the communication signal and (ii) a function circuitry which is connected to the electric path and performs a predetermined function by operating on a current flowing through the electric path, the function circuitry operating on a voltage lower than a first voltage value an I higher than or equal to a second voltage value, the first voltage value being a lowest voltage value at which the light source emits light,
wherein the power source circuit further applies to the electric path the voltage lower than the first voltage value and higher than or equal to the second voltage value.

12. A method for controlling a visible light communication apparatus,
the visible light communication apparatus including:
a light source;
a power source circuit which is connected to the light source via an electric path and applies to the electric path a voltage for causing the light source to emit light;
a modulation circuit which is connected to the electric path and modulates, based on a communication signal, a current value of a current flowing through the light source from the power source circuit, to cause the light source to emit light modulated by the communication signal; and
function circuitry which is connected to the electric path and performs a predetermined function by operating on a current flowing through the electric path, the function circuitry operating on a voltage lower than a first voltage value and higher than or equal to a second voltage value, the first voltage value being a lowest voltage value at which the light source emits light,
the method comprising:
applying to the electric path the voltage for causing the light source to emit light; and
further applying to the electric path the voltage lower than the first voltage value and higher than or equal to the second voltage value.

* * * * *

UNITED STATES PATENT AND TRADEMARK OFFICE
CERTIFICATE OF CORRECTION

PATENT NO. : 9,763,304 B2
APPLICATION NO. : 15/259638
DATED : September 12, 2017
INVENTOR(S) : Shojirou Kido It is certified that error appears in the above-identified patent and that said Letters Patent is hereby corrected as shown below:

In the Claims

At Column 17, Claim number 11, Line number 24, should read --- (ii) function circuitry which is connected to the ---

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*